United States Patent [19]

Kulawiec et al.

[11] Patent Number: 5,793,488
[45] Date of Patent: Aug. 11, 1998

[54] INTERFEROMETER WITH COMPOUND OPTICS FOR MEASURING CYLINDRICAL OBJECTS AT OBLIQUE INCIDENCE

[75] Inventors: Andrew W. Kulawiec, Fairport; James E. Platten, Penfield; John H. Bruning, Pittsford, all of N.Y.

[73] Assignee: Tropel Corporation, Fairport, N.Y.

[21] Appl. No.: 509,161

[22] Filed: Jul. 31, 1995

[51] Int. Cl.$^6$ .................................................... G01B 9/02
[52] U.S. Cl. ............................................. 356/354; 356/359
[58] Field of Search ................................... 356/353, 354, 356/356, 359, 360; 250/237 G

[56] References Cited

U.S. PATENT DOCUMENTS

| | | |
|---|---|---|
| 3,907,438 | 9/1975 | Holeman. |
| 4,391,526 | 7/1983 | McLaughlin. |
| 4,436,424 | 3/1984 | Bunkenburg. |
| 4,606,640 | 8/1986 | Hirst. |
| 4,653,522 | 3/1987 | Jarisch et al.. |
| 4,678,333 | 7/1987 | Anderson. |
| 4,791,584 | 12/1988 | Greivenkamp, Jr.. |
| 4,898,470 | 2/1990 | Cleaveland. |
| 5,041,726 | 8/1991 | Chang et al.. |
| 5,210,591 | 5/1993 | De Groot. |
| 5,220,403 | 6/1993 | Batchelder et al.. |
| 5,249,032 | 9/1993 | Matsui et al.. |
| 5,268,742 | 12/1993 | Magner. |
| 5,387,975 | 2/1995 | Ishida et al.. |
| 5,526,116 | 6/1996 | de Groot. |

FOREIGN PATENT DOCUMENTS

| | | |
|---|---|---|
| 106769 | 7/1974 | Germany. |
| 215388 | 11/1984 | Germany. |
| 233644 | 3/1986 | Germany. |
| 1142702 | 2/1969 | United Kingdom .................. 356/360 |

OTHER PUBLICATIONS

"Holographically Observed Torsion in a Cylindrical Shaft" by A. D. Wilson, Applied Optics, vol. 9, No. 9, Sep. 1970, pp. 2093–2097.

"Oblique Incidence Interferometry Applied to non–Optical Surfaces" by K. G. Birch, Journal of Physics E. Scientific Instruments, 1973, vol. 6, Great Britain, pp. 1045–1048.

"Measurement of Deformation in a Cylindrical Shell by Holographic Interferometry" by T. Matsumoto, K. Iwata, and R. Nagata, Applied Optics, vol. 13, No. 5, May 1974, pp. 1080–1084.

"Zone Plate Interferometer" by Raymond N. Smart, May 1974, vol. 13, No. 5, Applied Optics, pp. 1093–1099.

"Improved Oblique–Incidence Interferometer" by P. Hariharan, Optical Engineering, vol. 14, No. 3, May–Jun. 1975, pp. 257–258.

"Holographic Interferometer to Test Optical Surfaces" by Fernando Broder–Bursztyn and Daniel Malacara–Hernandez, Applied Optics, vol. 14, No. 9, Sep. 1975, pp. 2280–2282.

"Interferometric Surface Mapping with Variable Sensitivity" by W. Jaerisch and G. Makosch, Applied Optics, vol. 17, No. 5, 1 Mar. 1978, pp. 740–743.

"Interferometric Construction of Circular Gratinngs" by E. Leith, H. Chen, G. Collins, K. Schlten, G. Swanson, and J. Upatnieks, Applied Optics, vol. 19, No. 21, 1 Nov. 1980, pp. 3626–3630.

"Optical Figure Characterization for Cylindrical Mirrors and Lenses" by Alvin D. Schnurr and Allen Mann, Optical Engineering, vol. 20, No. 3, May/Jun. 1981, pp. 412–416.

(List continued on next page.)

*Primary Examiner*—Samuel A. Turner
*Attorney, Agent, or Firm*—Eugene Stephens & Associates

[57] ABSTRACT

Compound diffractive optics are used in an interferometer for simultaneously measuring multiple surfaces, making multiple measurements of individual surfaces, conveying test beams multiple times, and aligning pairs of the diffractive optics with each other. Typically, the compound optics have multiple diffraction zones that reshape test beams for reflecting from test surfaces or for combining with reference beams. The multiple diffraction zones can also exhibit different optical qualities such as transmission and reflection for conveying the test beams to and from the test surfaces.

66 Claims, 10 Drawing Sheets

OTHER PUBLICATIONS

"Cylindrical Lenses: Testing and Radius of Curvature Measurement" by R. Diaz–Uribe, J. Pedraza–Contreras, O. Cardona–Nunez, A. Cordero–Davila, and A. Cornejo Rodriquez, Applied Optics, vol. 25, No. 10, 15 May 1986, pp. 1707–1709.

"Testing Cylindrical Lenses" by Joseph M. Geary, Optical Engineering, vol. 26, No. 12, Dec. 1987, pp. 1219–1224.

"Data Analysis in Fiber Optic Testing of Cylindrical Optics" by Joseph M. Geary, Optical Engineering, Mar. 1989, vol. 28, No. 3, pp. 212–216.

"Interferometry on Wolter X–Ray Optics: A Possible Approach" by Joseph M. Geary, Optical Engineering, vol. 28, N. 3, Mar. 1989, pp. 217–221.

"Constant Radial Shearing Interferometry with Circular Gratings" by Qing–Shin Ru, Nagaaki Ohyama, Toshio Honda, and Jumpei Tsujiuchi, Applied Optics, vol. 28, No. 15, 15 Aug. 1989, pp. 3350–3353.

"Profile Measurement of an Aspheic Cylindrical Surface from Retroreflection" by Ding–tin Lin and Der–Shen Wan, Applied Optics, vol. 30, No. 22, 1 Aug. 1991, pp. 3200–3204.

"Profile Measurements of Cylindrical Surfaces" by Der–Shen Wan and Ding–tin Lin, Applied Optics, vol. 32, No. 7, 1 Mar. 1993, pp. 1060–1064.

"Determination of Two–Dimensional Planar Displacement by Moire Fringes of Concentric–Circle Gratings" by Yoon–Chang Park and Seung–Woo Kim, Applied Optics, vol. 33, No. 22, 1 Aug. 1994, pp. 5171–5176.

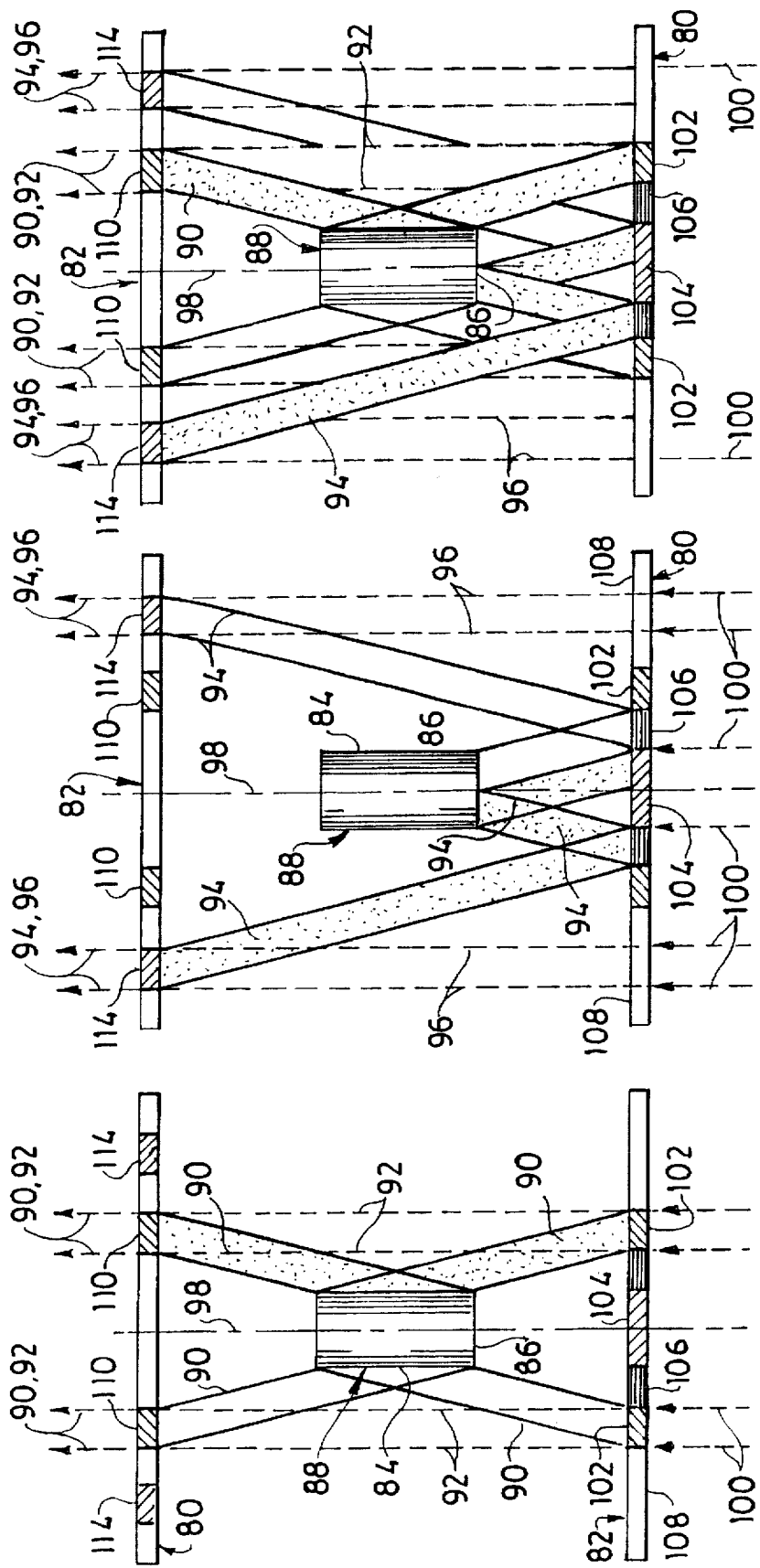

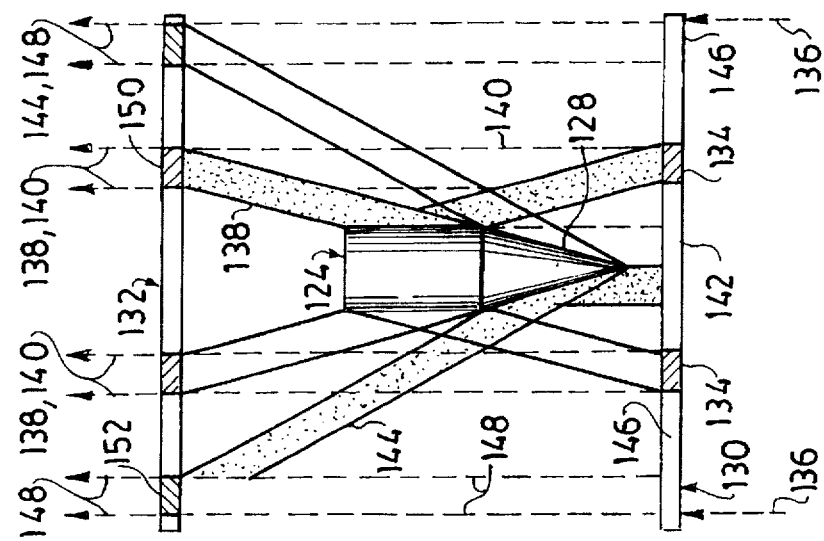
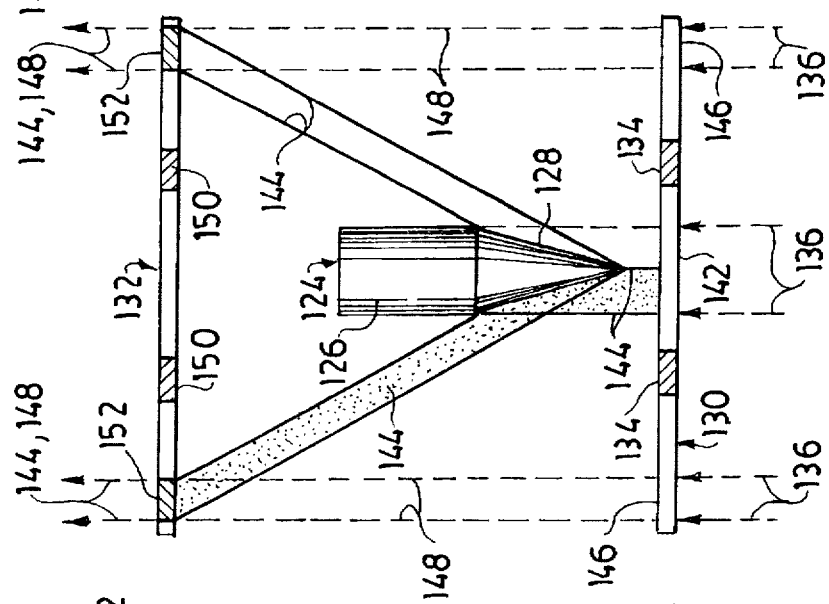
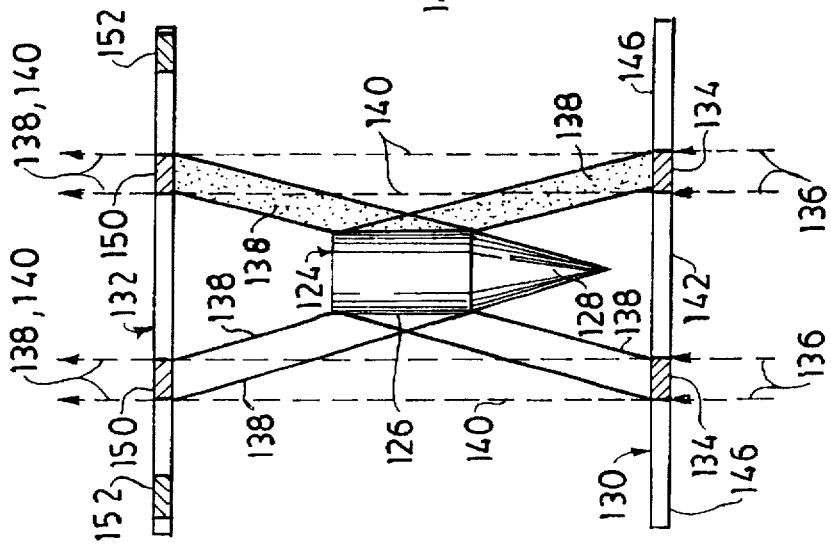

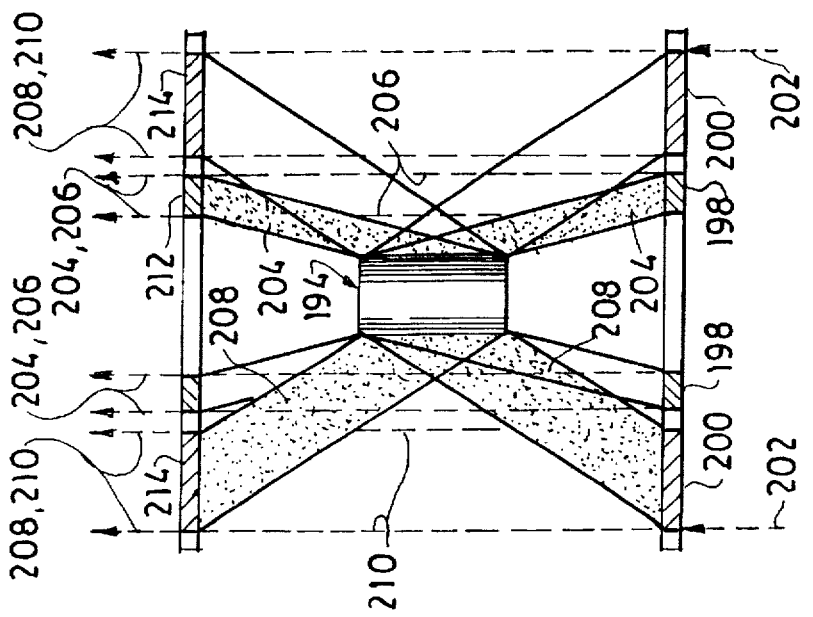
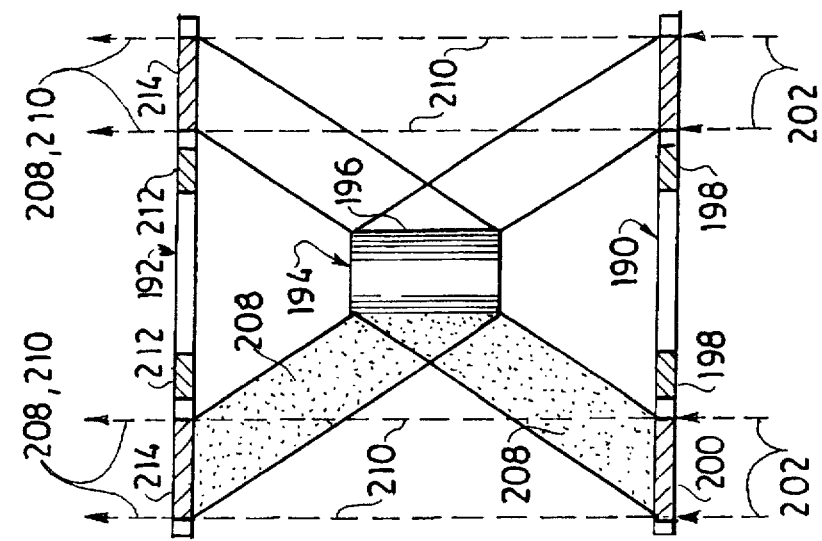
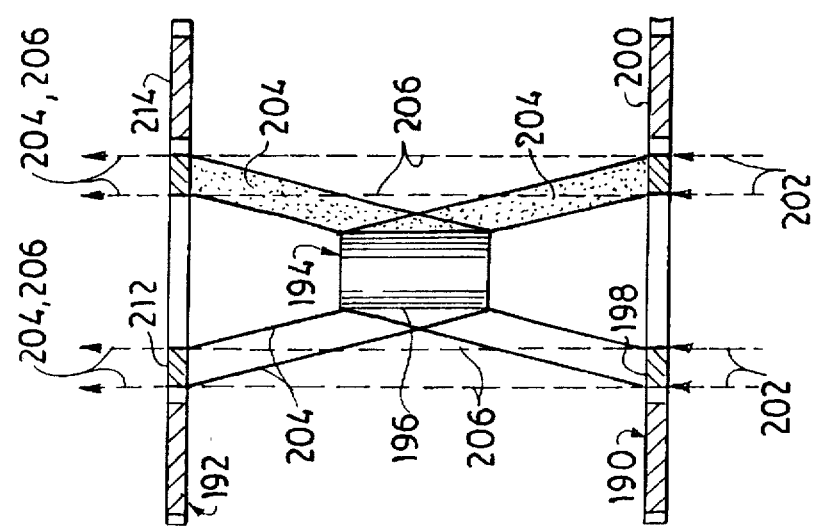

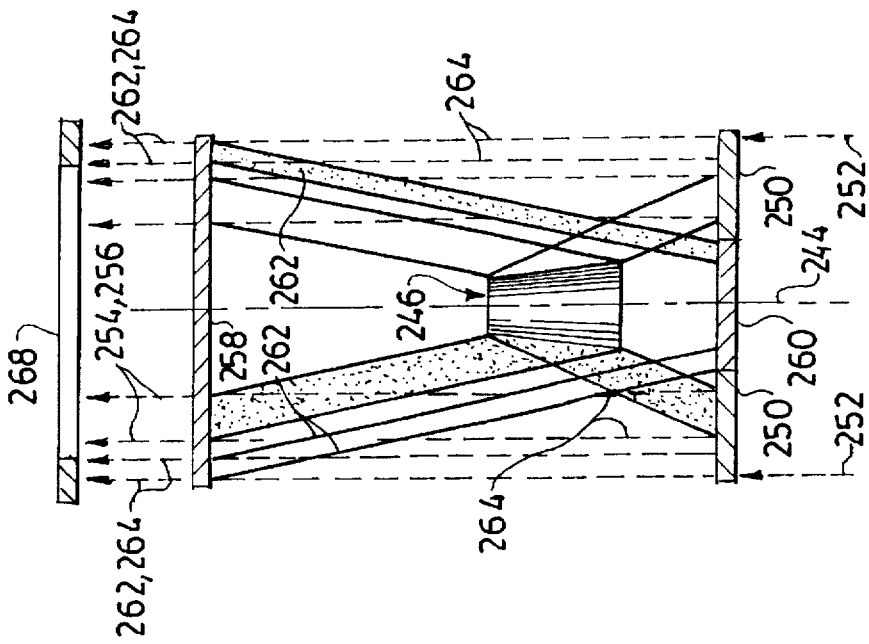
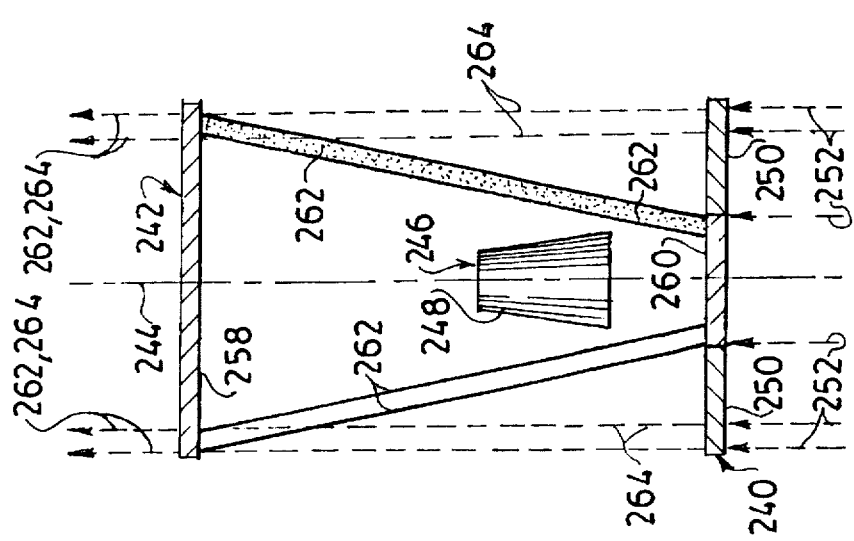
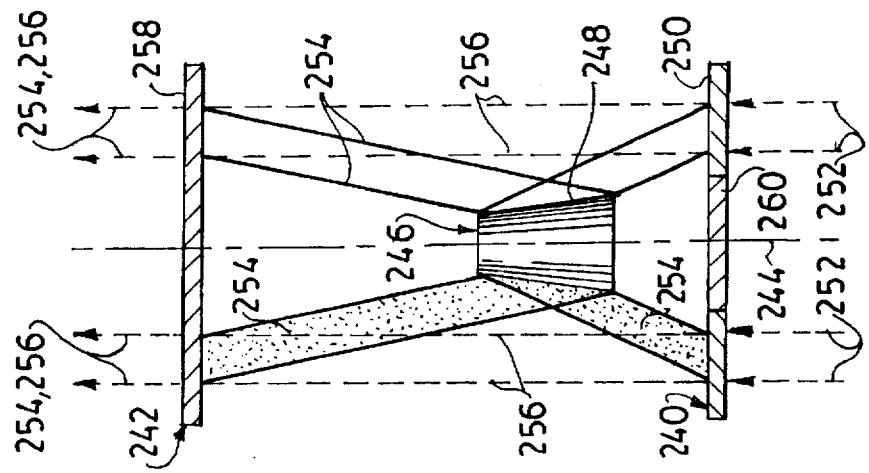

INTERFEROMETER WITH COMPOUND OPTICS FOR MEASURING CYLINDRICAL OBJECTS AT OBLIQUE INCIDENCE

TECHNICAL FIELD

The invention relates to improvements in interferometry for measuring test surfaces. Special attention is given to the shaping and conveyance of optical wavefronts for gathering information about the test surfaces.

BACKGROUND

Interferometers produce images of surfaces in the form of interference patterns that represent contour maps of surface variations. The interference pattern is created by combining a test wavefront (or beam) reflected from the test surface with a reference wavefront (or beam) representing a theoretical reflection from the surface. Highly reflective surfaces are usually measured by arranging the test wavefront to strike the test surface at normal incidence. Surfaces having lower reflectance are measured at grazing incidence.

However, interferometers are seldom used to measure surfaces other than planes or spheres because matching wavefronts are difficult to produce. Anamorphic optical elements can be used to produce the matching wavefronts; but these elements are expensive, difficult to make and test, and limited in accuracy. More conventional optics can also be used to construct the matching wavefronts by combining smaller portions of spherical or nearly spherical wavefronts. However, combining multiple measurements of conventional optics is time consuming and may require instrument motions that also detract from accuracy.

A less well-known and little developed interferometric approach to measuring both planar and cylindrical surfaces involves the use of diffractive optics for relatively shaping test and reference wavefronts. For example, a 1973 paper entitled "Oblique Incidence Interferometry Applied to Non-Optical Surfaces" by K. G. Birch, Journal of Physics E: Scientific Instruments, Volume 6, reports on the use of a pair of identical diffraction gratings for measuring planar surfaces at grazing incidence. The first diffraction grating divides test and reference wavefronts into different diffraction orders. The relatively inclined test wavefront is reflected from a planar test surface and is recombined with a reference wavefront at the second diffraction grating.

East German Patent 106769 issued to Johannes Schwider in 1974 proposes use of two identical gratings for measuring cylindrical surfaces at grazing incidence. The first diffraction grating divides a planar primary wavefront into test and reference wavefronts. The test wavefront is diffracted into an axiconic wavefront that is reflected from a cylindrical test surface at grazing incidence. The reference wavefront is transmitted without change. The second diffraction grating recombines the two wavefronts by transmitting the test wavefront without further change and by diffracting the reference wavefront into the axiconic form of the test wavefront.

Schwider also proposes use of compound diffractive optics for simultaneously measuring inside and outside cylindrical surfaces. Two diffraction zones of a first compound optic diffract two test wavefronts with respect to a reference wavefront into respective axiconic forms for reflecting from the inside and outside cylindrical surfaces. Two diffraction zones of a second identical compound optic separately diffract portions of the reference wavefront into axiconic forms matching the two test wavefronts.

Until recently, little practical exploitation of these ideas has been achieved. Many other alternatives are available for measuring planar surfaces; and further developments are required to provide accurate measurements over a wider range of surface geometries, especially test surfaces that further affect the shape of the test wavefront. Practical considerations relating to alternative setups for particular test pieces, efficiency of light conveyance, and control over image contrast were not adequately resolved.

Just recently, two co-assigned U.S. patent applications were filed by one of our co-inventors proposing the use of diffractive optics for forming test wavefronts that match a variety of complex surfaces at grazing incidence. Alternative setups and solutions for the various practical problems were disclosed. Both applications, namely, U.S. application Ser. No. 08/375,499, filed 19 Jan. 1995, and U.S. application Ser. No. 08/483,737, filed 7 Jun. 1995, are hereby incorporated by reference.

SUMMARY OF INVENTION

Our invention in one or more of its embodiments further expands the possibilities for making more complex measurements with interferometers, such as making simultaneous measurements of multiple surfaces or multiple measurements of single complex surfaces. Diffractive optics are incorporated into compound optical elements having multiple zones for conveying more than one test wavefront or for conveying a single test wavefront more than one time. The multiple zones can also be used to self-align the optical elements.

A first example of our new interferometer arranged for simultaneously measuring multiple surfaces of a test piece includes a light source that produces a primary wavefront which is divided into two test wavefronts and at least one reference wavefront. A first path through the interferometer conveys one of the test wavefronts incident to one of the multiple surfaces, a second path through the interferometer conveys the other of the test wavefronts incident to another of the multiple surfaces, and a third path through the interferometer conveys the reference wavefront independently of the multiple surfaces between positions of alignment with the two test wavefronts. An optical system relates both of the test wavefronts to the reference wavefront for producing patterns of interference between each of the two test wavefronts and the reference wavefront indicative of variations in the multiple surfaces.

The optical system includes a first compound optic having different zones for conveying the two wavefronts. A first of the zones has a diffracting pattern that relatively reshapes one of the test wavefronts with respect to the reference wavefront. A second of the zones exhibits a different optical characteristic, such as transmission or reflection, for conveying the other test wavefront without diffraction. The first compound optic can also include a third zone for conveying the reference wavefront independently of the two test wavefronts. A second compound optic can be used to combine the two test wavefronts with the reference wavefront to relate the two wavefronts to each other as well as to the reference wavefront for comparing the relative orientations of the multiple surfaces.

A second example of our new interferometer, which is arranged for making multiple measurements of a test surface, also requires a light source that produces two test wavefronts and at least one reference wavefront. A first path reflects a first of the test wavefronts from the test surface, a second path reflects a second of the test wavefronts from the same test surface, and a third path conveys the reference wavefront independently of the test surface into alignment with the two test wavefronts. The two test wavefronts are preferably conveyed by distinct zones of at least one compound optic for relating the test wavefronts to a common datum. The two resulting interference patterns can be compared to corroborate each other or to measure different orders of surface variations such as surface roughness and surface waviness.

Preferably, the first and second zones of a first compound optic have different diffracting patterns that relatively reshape the two test wavefronts into different forms for reflecting from the test surface at different grazing angles. A second compound optic having distinct zones with different diffracting patterns is also preferably used for further relatively reshaping the two reflected test wavefronts into a form in common with the same reference wavefront.

A third example of our new interferometer features a compound optic for conveying a test wavefront more than once. In conjunction with the usual features of a light source and the requisite paths for test and reference wavefronts, the compound optic has multiple zones for conveying the test wavefront both to and from a test surface. A first of the multiple zones exhibits a first optical characteristic for conveying the test wavefront to the test surface, and a second of the multiple zones exhibits a second optical characteristic for conveying the test wavefront from the test surface. At least one of the zones has a diffracting pattern for relatively diffracting the test wavefront with respect to the reference wavefront.

One of the zones of the compound optic also preferably exhibits at least partial reflection. Diffracting patterns can be used to reshape the test wavefront before or after reflection from the test surface as well as to separate or combine the test and reference wavefronts. Additional zones can be used to convey the reference wavefront independently of the test wavefront or to convey other test wavefronts.

A fourth example of our new interferometer forms at least one of a pair of diffractive optics as a compound optic for aligning the pair to a common reference axis. A first of the diffractive optics has a measurement zone that relatively reshapes the test wavefront with respect to the reference wavefront for reflecting the test wavefront from the test surface at a grazing angle. A second of the diffractive optics has a measurement zone that further relatively reshapes the test wavefront with respect to the reference wavefront for producing an optical interference pattern between the test and reference wavefronts indicative of variations in the test surface. At least one of the diffractive optics also has an alignment zone that differs from the measurement zone of the same diffractive optic for aligning the first and second diffractive optics with the common reference axis.

The alignment zone is preferably a diffraction zone having a pitch that varies with respect to the measurement zone of the same diffractive optic but matches the pitch of the measurement zone of the other diffractive optic. This allows a resulting interference pattern to be used to align the two optics in a null condition. Alternatively, both diffractive optics could include alignment zones having focusing qualities for spacing the optics along the reference axis.

DRAWINGS

FIGS. 6A–6C is a set of diagrams showing the arrangement of leading and following diffractive optics for simultaneously measuring side and end surfaces of a cylindrical test piece.

FIGS. 8A–8C is a set of diagrams showing the arrangement of leading and following diffractive optics for simultaneously measuring the external surfaces of a cylinder and cone.

FIGS. 9A–9C is a set of diagrams showing the arrangement of leading and following diffractive optics for simultaneously measuring the same surface of a cylinder with two different test wavefronts.

FIGS. 11A–11C is a set of diagrams showing the arrangement of leading and following diffractive optics for both measuring a test surface and aligning the leading and following diffractive optics.

DETAILED DESCRIPTION

Our invention can be incorporated in most interferometer arrangements including single- or double-pass interferometers but is especially well suited for making at least some measurements at non-normal angles of incidence. We refer to such angles as "grazing angles" which we define as non-normal angles inclined from test surfaces within a range of specular reflection.

Our invention preferably incorporates diffractive optics for manipulating optical wavefronts (or beams). FIGS. 2–5 provide additional background information about such use of diffractive optics as first disclosed in prior co-pending U.S. patent applications Ser. Nos. 08/375,499 and 08/483, 737. The remaining drawing figures depict various improvements in managing optical wavefronts according to our subject invention.

Figure 1:
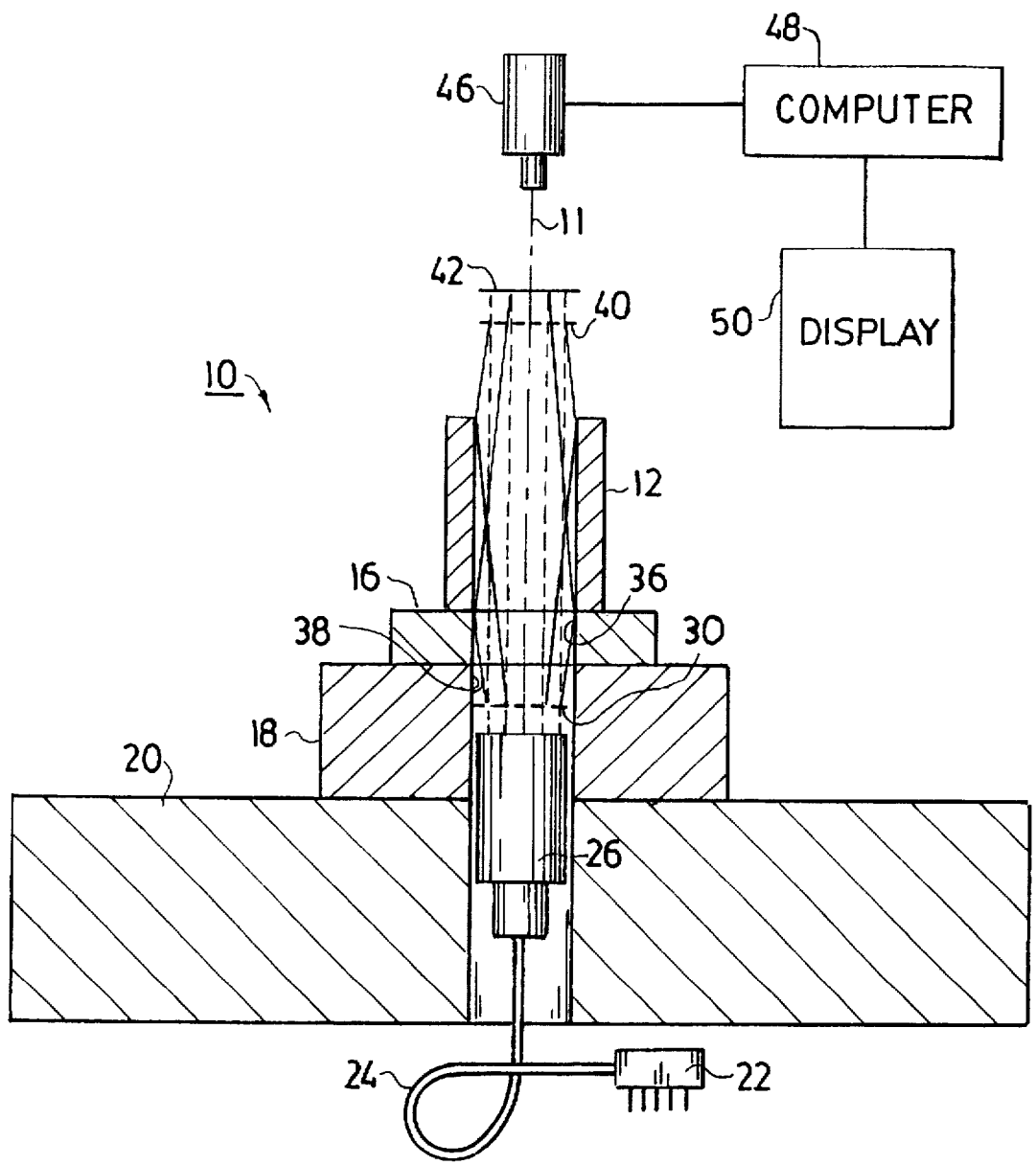
FIG. 1 is a schematic diagram of my new interferometer set up for single-pass measurement with two diffractive optics.
Figure 2:
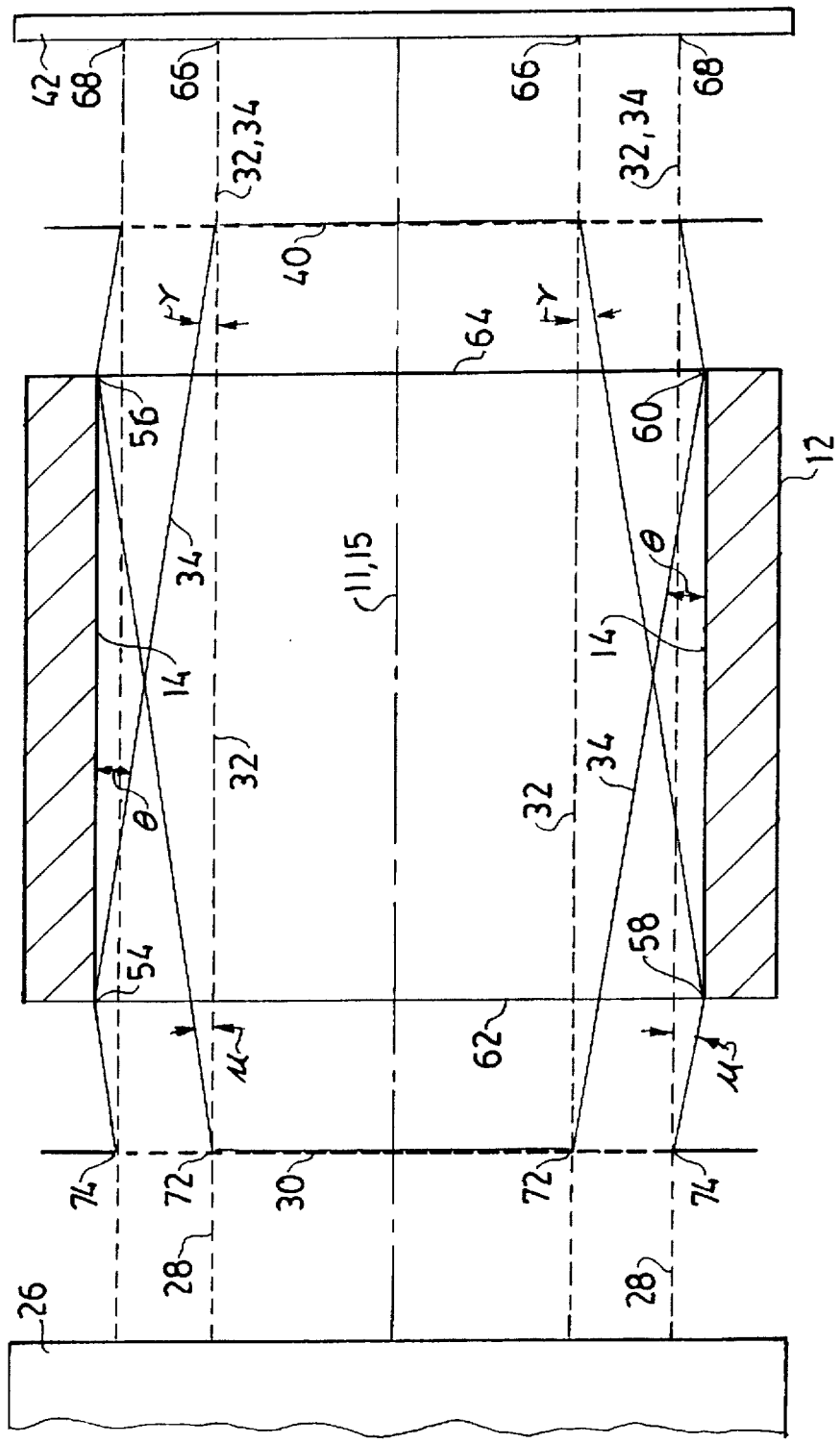
FIG. 2 is a diagram of the diffractive optics used in the interferometer for measuring internal cylindrical test surfaces.

An exemplary interferometer 10 is depicted in FIG. 1 in a Mach-Zender arrangement. A test piece 12, shown also in FIG. 2, is mounted on an air bearing 16 carried by a surface plate 18 on a base 20. The air bearing 16 provides both rotational and translational control over the test piece 12 to permit multiple measures from different positions. Mathematical comparisons between the multiple measures can be used to separate systematic errors.

A light source 22, such as a laser diode or a HeNe laser, produces a beam of coherent light. An optical fiber 24 transmits the beam through the base 20 to a collimator 26 that shapes the beam into a planar primary wavefront 28 represented by selected rays. A leading diffractive optic 30, such as a circular transmissive diffraction grating or binary optic, divides the planar wavefront 28 into a reference wavefront 32 and a test wavefront 34. The reference wavefront 32 remains a planar wavefront. However, the test wavefront 34 is reshaped by the leading diffractive optic 30 into an axiconic wavefront composed of rays that are uniformly inclined to a reference axis 11 through a first diffraction angle "μ", which is measured within axial planes of the reference axis 11.

Respective transparent openings 36 and 38 through the air bearing 16 and the surface plate 18 provide clearance enabling the reference and test wavefronts 32 and 34 to propagate along the reference axis 11 through a hollow center of the test piece 12. The test wavefront 34 reflects from different positions of the cylindrical test surface 14 at a constant grazing angle "θ". A following diffractive optic 40 further reshapes the reflected test wavefront 34 back into a planar wavefront through a second diffraction angle "γ". For measuring nominally straight cylindrical surfaces, the two diffraction angles "μ" and "γ" are equal to each other and to the constant grazing angle "θ".

Figure 3:
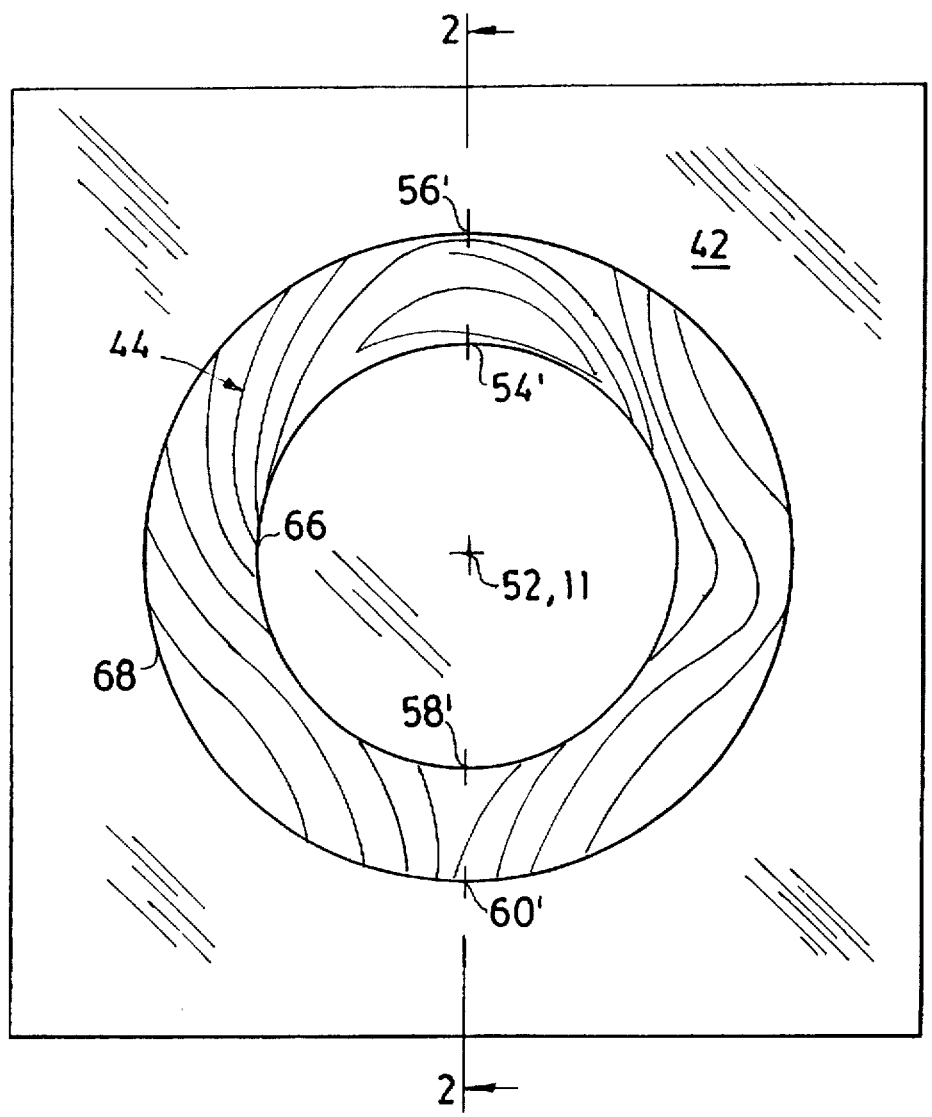
FIG. 3 is an axial view of an image-forming optic displaying an interference pattern representative of deviations in the test surface.

Thus, both the reference and test wavefronts 32 and 34 emerge from the following diffractive optic 40 as interfering planar wavefronts. With reference also to FIG. 3, an image-forming optic 42 images a pattern (referred to as an interferogram) 44 of the interference at the following diffractive optic 40 onto an image-recording device, such as a camera 46. The imaged interference pattern 44, which is superimposed on the test surface 14, represents deviations of the test surface 14 from a theoretical cylindrical surface.

The interfering test and reference wavefronts 32 and 34 could also emerge from the following diffractive optic 40 in a common form that differs from the illustrated planar form. For example, the reference wavefront could be diffracted into an axiconic wavefront matching the test wavefront. The imaging optic 42 would be appropriately modified to present the required image to the camera 46.

The camera 46, which preferably incorporates a solid state or a charge-coupled device (CCD), records the interference pattern for processing by a computer 48. The image-forming optic can be incorporated into the camera 46 or can be provided as one or more separate elements. A display device 50, such as a cathode-ray tube, flat panel device, or printer, displays information about the cylindrical test surface 14 in a useful form. In addition to topographical information, derivable measures such as roundness, straightness, taper, and cylindricity could also be displayed. Alternatively, the information could be electronically stored or transmitted for use in another operation, such as feedback to a manufacturing operation.

FIG. 3 depicts the annular interference pattern 44 that appears at the following diffractive optic 40. A reference point 52 in the interference pattern 44 coincides with a point of intersection by the reference axis 11. Exemplary points of reflection 54, 56, 58, and 60 from the cylindrical test surface 14 correspond to points 54', 56', 58', and 60' in the interference pattern 44.

Angles about the reference axis 11 between the points of reflection 54, 56 and 58, 60 from the cylindrical test surface 14 correspond to similar angles between the points 54', 56' and 58', 60' about the reference point 52. However, axial distances along the reference axis 11 between the points of reflection 54, 58 and 56, 60 relate to radial distances between the points 54', 58' and 56', 60' from the reference point 52. For example, the points of reflection 54 and 58 at one end 62 of the cylindrical test surface 14 have corresponding points located at a shorter radial distance in the interference pattern 44 than the points of reflection 56 and 60 at the other end 64 of the cylindrical test surface 14.

Height deviations of the cylindrical test surface 14 from the theoretical test surface at the points of reflection 54, 56, 58, and 60 appear as phase differences at the corresponding points 54', 56', 58', and 60' in the interference pattern 44. Accurate measures of these phase differences are obtained by conventional phase shifting techniques in which optical path differences between the reference wavefront 32 and the test wavefront 34 are stepped through integer subdivisions of one wavelength. Intensity information at each phase step is stored and a complete phase map is calculated by established Fourier series methods. The stepping can be accomplished in a variety of ways such as by axially translating one of the diffractive optics 30 or 40, preferably the leading optic 30, or by changing the wavelength of the primary wavefront 28.

Sensitivity of the interferometer 10, which is a measure of the amount of deviation represented by adjacent fringes in the interference pattern 44, decreases with increasing grazing angles "θ". Accordingly, larger grazing angles "θ" within the range of specular reflection of the test surface 14 are preferred for improving accuracy of individually measured points.

However, grazing angles "θ" can also affect the size of the diffractive optics as well as the resolving power of the interferometer 10. The camera 46 is preferably arranged with an adjustable focus to equalize the resolution of points imaged along the innermost and outermost circumferences 66 and 68 of the interference pattern 44. Some limitation of the imaging angles seen by the camera 46 may be desirable to control differences between the resolution of points imaged along the innermost and outermost circumferences 66 and 68 of the interference pattern.

Figure 4:
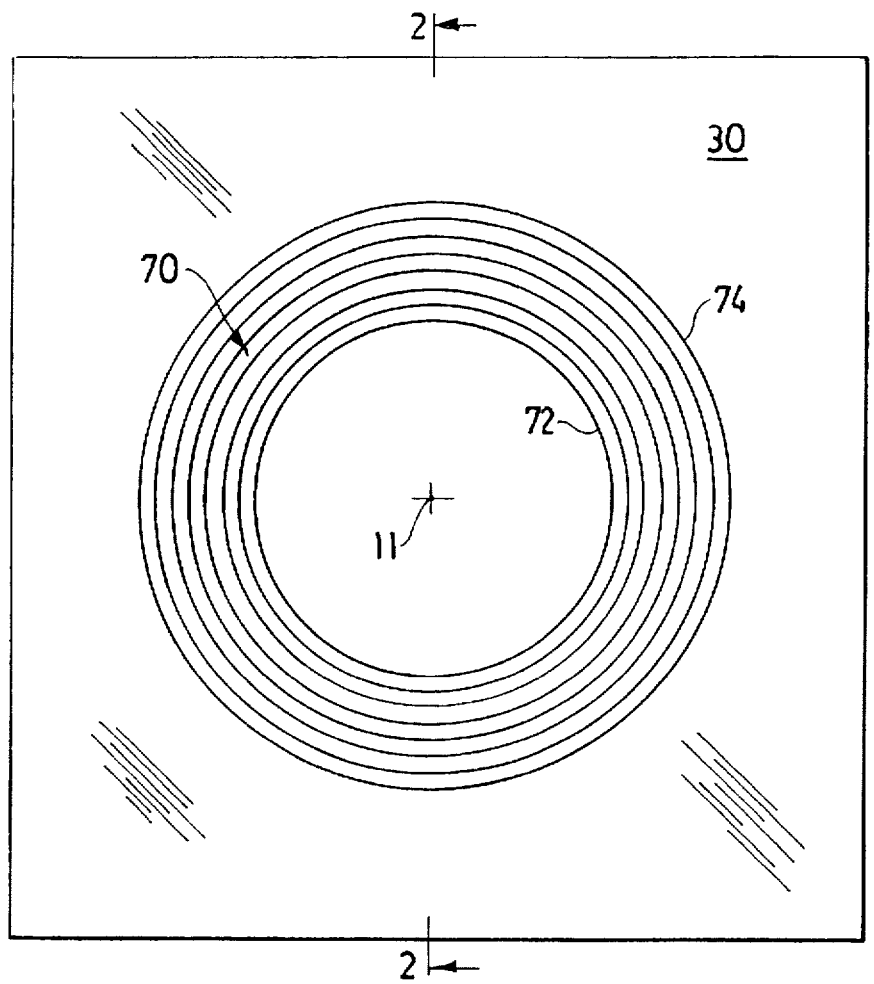
FIG. 4 is an axial view of one of the diffractive optics.
Figure 5:
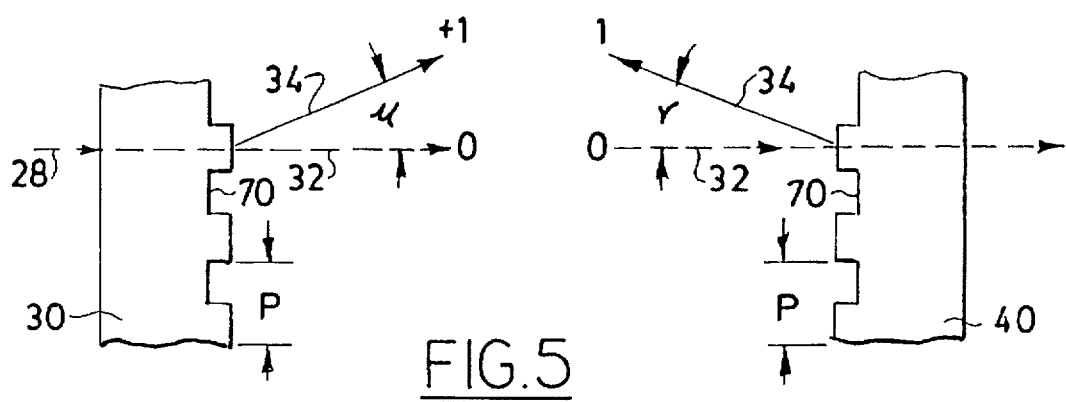
FIG. 5 is a fragmentary cross-sectional view of two diffractive optics.

The leading and following diffractive optics 30 and 40 are further illustrated by FIGS. 4 and 5. In FIG. 4, the leading diffractive optic 30 is shown as a diffraction grating having a diffracting pattern formed by a number of concentric closed-shaped grooves 70 for dividing light into two different diffraction orders. The following diffractive optic 40 is preferably a similar grating oriented as shown in the fragmentary cross-sectional view of FIG. 5. With the zero diffraction order aligned with the reference axis 11, positive or "+" diffraction orders refer to light rays that are diffracted toward the reference axis 11, and negative or "−" diffraction orders refer to light rays that are diffracted away from the reference axis 11.

The reference wavefront 32 is preferably transmitted (diffracted) by both diffractive optics 30 and 40 at a zero diffraction order, and the test wavefront 34 is preferably transmitted (diffracted) by both optics 30 and 40 at a first diffraction order. However, the leading diffractive optic 30 divides the reference and test wavefronts 32 and 34, and the following diffractive optic 40 combines the two wavefronts 32 and 34.

Different combinations of diffraction orders could also be used to divide or combine the reference and test wavefronts. For example, the reference wavefront could be diffracted into a positive first order and the test wavefront could be diffracted into a negative first order for relatively reshaping both wavefronts. The following diffractive optic could also be used at a higher diffraction order than the leading diffractive optic (or vice versa) for testing surfaces that have a high angle of inclination to the reference axis. Also, the test wavefront could be diffracted by the following diffractive optic at a zero order, and the reference wavefront could be diffracted by the same optic at a higher order to match the test wavefront.

The grooves 70 in both gratings are spaced at a constant pitch "p" for uniformly inclining the test beam 34 with respect to the reference beam 32 through the diffraction angles "μ" and "γ". 30 Sensitivity, as a measure of units per fringe, is equal to one-half of the pitch "p" for first order diffractions of the test wavefront. Although varying in scale, the grooves 70 have paths that are shaped to match transverse sections of the cylindrical test surface 14. For example, inner groove 72 matches the circular section at the far end 64 of the test surface 14, and outer groove 74 matches the circular section at the near end 62 of the test surface 14. Together, the shape and spacing of the grooves 70 represent a mathematical description of the test surface 14.

Profiles of the grooves 70 can be shaped to control diffraction energies in the zero, first, and higher diffraction orders. For example, the grooves 70 can be blazed to concentrate diffraction energies within only two diffraction orders, which are used for diffracting the reference and test wavefronts 32 and 34. The depth or width of the grooves 70 can also be varied to appropriately divide the diffraction energies between the interfering reference and test wavefronts 32 and 34 to maximize contrast of the interference pattern 44. Accounting also for the reflectivity of the test surface 14, either or both of the diffractive optics 30 or 40 can be modified to accomplish this.

The diffractive optics 30 and 40 can be made to high accuracy by photolithographically exposing and etching coatings under computer control. This method of manufacture enables complex mathematical descriptions of test surfaces to be readily embedded into the diffractive optics. Alternatively, the diffractive optics 30 and 40 can be made by etching glass substrates for improving durability or by modifying the underlying substrate to exhibit similar modulations in amplitude or phase.

The remaining drawing figures depict various examples of improvements that are made possible by our subject invention. All of the examples involve modifications to diffractive optics for accomplishing additional functions. In many instances, paths of the test and reference beams accomplishing different functions overlap, so separate drawings are provided of the different functions as well as drawings showing the combined functions.

For example, FIGS. 6A–6C, 7A, and 7B depict compound leading and following diffractive optics 80 and 82 for measuring two surfaces 84 and 86 of a cylindrical test piece 88. FIG. 6A shows the respective paths of a first test beam 90 and a first reference beam 92 for measuring side surface 84 of the test piece 88. FIG. 6B shows the respective paths of a second test beam 94 and a second reference beam 96 for measuring end surface 86 of the test piece. FIG. 6C shows the two test beams 90 and 94 and the two reference beams 92 and 96 for simultaneously measuring both the side surface 84 and end surface 86 of the test piece 88.

Figure 7C:
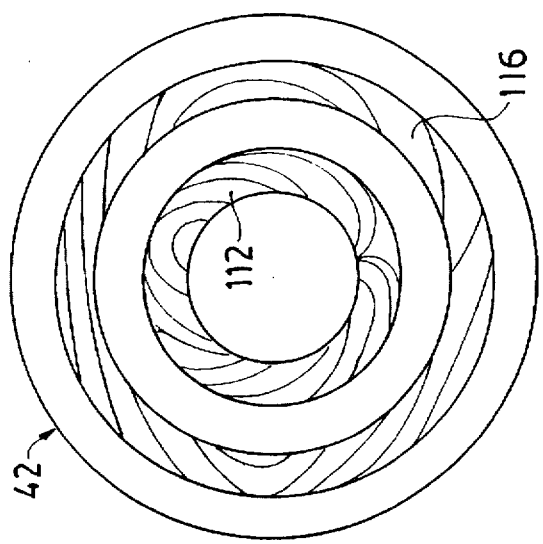
FIG. 7C is an axial view of an exemplary interference pattern resulting from the measurement of the two surfaces of the cylindrical test piece.

The leading and following diffractive optics 80 and 82 are aligned to a common reference axis 98 along which a primary beam 100 is propagated. The leading diffractive optic 80, shown also in FIG. 7A, is a compound optic having a first diffraction zone 102 that divides a portion of the primary beam 100 into the first test beam 90 and the first reference beam 92 and that reshapes the first test beam 90 into a different form for reflecting from the side surface 84 at a first predetermined grazing angle. A second diffraction zone 104 of the leading diffractive optic 80 passes another portion of the primary beam 100 as the second test beam 94 and reshapes the second test beam 94 into a different form for reflecting from the end surface 86 at a second predetermined grazing angle. Upon reflection from the end surface 86, the second test beam 94 is returned to the leading diffractive optic 80 in a different location where it is re-reflected by a reflection zone 106. Finally, a transmission zone 108 passes yet another portion of the primary beam 100 as the second reference wavefront 96.

Figure 7B:
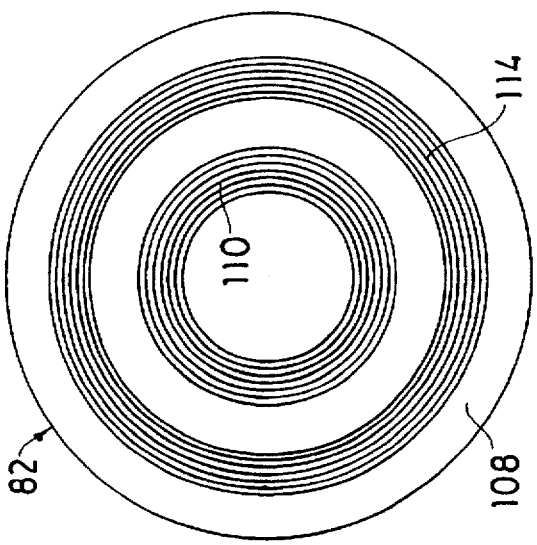
FIG. 7B is an axial view of the following diffractive optic of FIGS. 6A–6C.
Figure 7A:
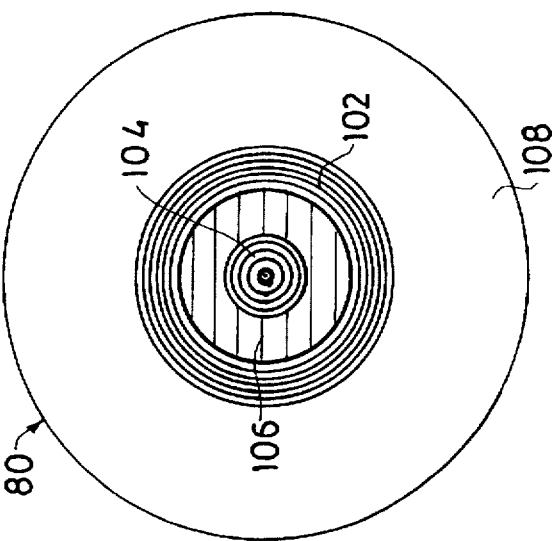
FIG. 7A is an axial view of the leading diffractive optic of FIGS. 6A–6C.

The following diffractive optic 82, shown also in FIG. 7B, is also a compound optic. A first diffraction zone 110 further reshapes the first test beam 90 into a form in common with the first reference beam 92 and combines the first test and reference beams 90 and 92 for producing a first interference pattern 112 (see FIG. 7C) representing variations in the side surface 84. Similarly, a second diffraction zone 114 further reshapes the second test beam 94 into a form in common with the second reference beam 96 and combines the second test and reference beams 94 and 96 for producing a second interference pattern 116 representing variations in the end surface 86.

Since the test beams 90 and 94 are conveyed by the same diffractive optics 80 and 82, the resulting interference patterns 112 and 116 apparent from the image-forming optic 42 are related by a common datum to each other. This permits the computer 48 of FIG. 1 to compare the relative orientation between the side and end surfaces 84 and 86. Preferably, the multiple zones of the respective leading and following diffractive optics are formed in common substrates to provide for accurately relating the two test beams 90 and 94.

Another example of the simultaneous measurement of two surfaces is depicted by FIGS. 8A–8C. An exemplary test piece 124 has a cylindrical surface 126 similar to the preceding example and a conical surface 128. Leading and following diffractive optics 130 and 132 are each divided into zones for simultaneously measuring the two surfaces 126 and 128.

The leading diffractive optic 130 includes a diffraction zone 134 similar to the preceding embodiment for dividing a portion of a primary beam 136 into a first test beam 138 and a first reference beam 140 and for reshaping the first test beam 138 to reflect from the cylinder surface 126 at a predetermined grazing angle. A first transmission zone 142 passes another portion of the primary beam 136 as a second test beam 144 that reflects from the conical surface 128 at a second predetermined grazing angle. A second transmission zone 146 passes yet another portion of the primary beam 136 as a second reference beam 148. Alternatively, the first transmission zone 142 could be made as a second diffraction zone similar to the preceding embodiment for reshaping the first test beam 138 prior to reflecting from the conical surface 128.

The following diffractive optic 132 has two diffraction zones 150 and 152. The diffraction zone 150 reshapes the first test beam 138 into a form in common with the first reference beam 140 and combines the first test and reference beams 138 and 140 for producing an interference pattern of variations in the cylindrical surface 126. The diffraction zone 152 reshapes the second test beam 144 into a form in common with the second reference beam 148 and combines the second test and reference beams 144 and 148 for producing an interference pattern of variations in the conical surface 128. The two interference patterns (not shown) are related by the multiple zones of the diffractive optics 130 and 132 for conveying the first and second test beams 138 and 144.

An example of the multiple measurement of the same surface with compound diffractive optics is shown in FIGS.

9A–9C. Again, compound leading and following diffractive optics 190 and 192 are used. A test piece 194 has a single cylindrical test surface 196 being measured.

The leading diffractive optic 190 includes two diffraction zones 198 and 200. The diffraction zone 198, which is similar to the diffraction zones 102 and 134 of two preceding embodiments, divides a portion of a primary beam 202 into a first test beam 204 and a first reference beam 206. The diffraction zone 200 divides another portion of the primary beam 202 into a second test beam 208 and a second reference beam 210. The two test beams 204 and 208 are also reshaped by their respective diffraction zones 198 and 200 to reflect from the same test surface 196 at different grazing angles.

The following diffractive optic 192 also includes two diffraction zones 212 and 214. The diffraction zone 212 reshapes and combines the first test beam 204 with the first reference beam 206. The diffraction zone 214 reshapes and combines the second test beam 208 with the second reference beam 210. The combined pairs of test and reference beams 204, 206 and 208, 210 produce respective interference patterns of variations in the test surface 196. The two interference patterns can be compared to corroborate each other or to measure different orders of surface variations (e.g., surface roughness and surface waviness).

Figure 10:
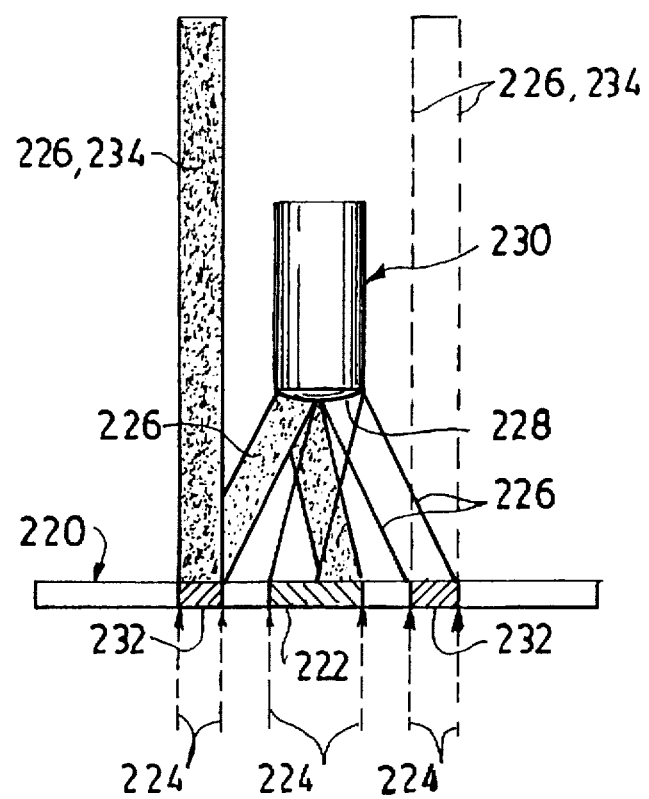
FIG. 10 is a diagram of a single compound optic functioning as both a leading and following diffractive optic for measuring the end surface of a cylinder.

FIG. 10 depicts an example of a single compound optic 220, which functions as both a leading and following diffractive optic. A first diffraction zone 222 reshapes a portion of a primary beam 224 into a test beam 226 for reflecting from a test surface 228 of a test piece 230 at a relatively steep grazing angle. A second diffraction zone 232 transmits another portion of the primary beam 224 as a reference beam 234 and reflects, reshapes, and combines the test beam 226 with the reference beam 234. The combined test and reference beams 226 and 234 produce an interference pattern indicative of variations in the test surface 228. The first diffraction zone 222 can be blazed to concentrate spectral energy within a single diffraction order, but the second diffraction zone 232 requires a first diffraction order that is transmitted and a second diffraction order that is reflected.

Alternatively, second diffraction zone 232 could be arranged to reflect a portion of the primary beam 224 as the reference beam 234 and transmit, reshape, and combine the test beam 226 with the reference beam. Also, instead of transmitting or reflecting the reference beam 234 and reshaping and combining the test beam 226 with the reference beam 234, the second diffraction zone could be arranged to retroreflect the test beam 226 as a part of a double-pass interferometer configuration. The first diffraction zone 222 would then be required to reflect a portion of the primary beam 224 as the reference beam 234 as well as to combine the test and reference beams 226 and 234.

An example of our invention for aligning a pair of leading and following diffractive optics 240 and 242 to a common reference axis 244 is shown in FIGS. 11A–11C. A test piece 246 measured by the leading and following diffractive optics 240 and 242 is a tapered cylinder or truncated cone having a test surface 248.

For measuring the test surface 248, the leading diffractive optic 240 has a diffractive measurement zone 250 that divides a portion of a primary beam 252 into a first test beam 254 and a first reference beam 256 and that reshapes the first test beam 254 into a different form for reflecting from the test surface 248 at a predetermined grazing angle. The following diffractive optic 242 has a diffractive measurement zone 258 that reshapes and combines the first test and reference beams 254 and 256 for producing an interference pattern indicative of variations in the test surface 248.

For aligning the two diffractive optics 240 and 242, the leading diffractive optic has an alignment zone 260 that transmits another portion of the primary beam 252 as a second test beam 262 and reshapes the second test beam 262 into a form that matches the overall form of the first test beam 254 after reflection from the test surface 248. The measurement zone 250 of the leading diffractive optic has an extended portion that transmits yet another portion of the primary beam 252 as a second reference beam 264. A similarly extended portion of the measurement zone 258 of the following diffractive optic reshapes and combines the second test and reference beams 262 and 264 for producing an interference pattern indicative of variations in the alignment of the leading and following diffractive optics 240 and 242 to the reference axis 244.

Preferably, the alignment zone 260 of the leading diffractive optic has a diffracting pattern that matches a diffracting pattern of the measurement zone 258 of the following diffractive optic but differs from the measurement zone 250 of the leading diffractive optic. For example, both zones 260 and 258 preferably have the same or similar pitch for aligning the two diffractive optics 240 and 242 in a so-called null condition registered by the resulting interference pattern. That is, any variation from the desired alignment is apparent from the resulting interference pattern.

Alternatively, both diffractive optics 240 and 242 could include respective alignment zones with similar diffracting patterns. The two alignment zones could also be made with varying pitch to provide focusing qualities for adjusting the desired separation between the diffractive optics 240 and 242. Preferably, whatever focusing qualities are introduced into the second test beam 262 by the leading diffractive optic 240 are removed by the following diffractive optic 242 for comparing the second test and reference beams 262 and 264 in a null condition.

Although it would be possible to simultaneously measure the test surface 248 while monitoring the alignment of the leading and following diffractive optics 240 and 242, the measurement and alignment functions are preferably performed separately. During measurement of the test surface 262, a spatial filter 268 can be used to block light used for alignment of the diffractive optics. The spatial filter can take a variety of forms including an adjustable aperture. The test piece 246 itself could also be used to block light used for alignment.

All of the preceding examples disclosing our preferred forms of the invention are primarily arranged for single-pass measurements using leading and following diffractive optics for conveying both test and reference wavefronts. However, it would be possible to incorporate reflective optics for performing similar double-pass measurements and to convey one or more reference wavefronts independently of the leading and following diffractive optics.

Our invention can also be used to measure other and more complex three-dimensional surfaces, including inside, outside, and end surfaces of non-circular cylinders and cones, as well as involute profiles. However, the invention is especially suited for measuring machined surfaces such as cylinder bores, pistons, tapered roller bearings, and gear teeth. The non-linear paths of the diffractive optics can be varied to match non-circular transverse sections of test surfaces, and the pitch spacing of the diffracting patterns can be varied to match curvatures in axial sections of the test surfaces. The diffractive optics can also be stepped or curved to further shape the wavefronts or to provide focusing qualities. Limited arcuate sections of the gratings can be used to measure surfaces that lack an axis of symmetry. Where possible, sensitivity of the interferometer is preferably held constant but can be varied by changing the pitch of the diffracting pattern.

The multiple zones of the compound optics are preferably formed in a common substrate. However, the zones could also be formed in separate structures interrelated by a common datum such a mounting fixture. The different reference beams that are actually portions of the same reference wavefront can also be considered as a single reference beam or wavefront. Additional zones could also be used for simultaneously measuring more surfaces or making more measurements of a single surface. Those of skill in this art will also appreciate that the multiple functions of the various examples can be interchanged and combined to construct compound optics for performing even more functions.

We claim:

1. An interferometer for measuring multiple surfaces of a test piece comprising:

a source of light that produces two test wavefronts and at least one reference wavefront;

an optical system including a first optical path along which one of the test wavefronts is conveyed incident to one of the multiple surfaces, a second optical path along which the other of the test wavefronts is conveyed incident to another of the multiple surfaces, and a third optical path along which the reference wavefront is conveyed independently of the multiple surfaces into alignment with the two test wavefronts;

said optical system relating each of the two test wavefronts to the reference wavefront for producing patterns of interference between each of the two test wavefronts and the reference wavefront indicative of variations in the multiple surfaces;

said optical system also including a compound optic having different zones for conveying the two test wavefronts along the respective first and second optical paths;

a first of said zones being a diffraction zone that relatively reshapes one of the test wavefronts with respect to the reference wavefront; and a second of said zones exhibiting a different optical characteristic for conveying the other test wavefront without diffraction.

2. The interferometer of claim 1 in which said second zone is a transmissive zone for conveying the other of the test wavefronts.

3. The interferometer of claim 2 in which said compound optic includes a third zone for conveying the reference wavefront independently of the two test wavefronts.

4. The interferometer of claim 3 in which said first compound optic includes a fourth zone for further conveying one of the test wavefronts.

5. The interferometer of claim 4 in which said fourth zone is a reflective zone.

6. An interferometer for making multiple measurements of a test piece at grazing incidence comprising:

a source of light that produces two test wavefronts and at least one reference wavefront;

an optical system including a first optical path along which a first of the test wavefronts is reflected from a substantial area of the test piece at a grazing angle, a second optical path along which a second of the test wavefronts is reflected from the same substantial area of the test piece at a grazing angle and a third path along which the reference wavefront is conveyed independently of the test piece into alignment with the two test wavefronts;

said optical system including a first compound optic that includes distinct zones for optically relating the two test wavefronts to a common datum;

said distinct zones being positioned on said first compound optic for separately conveying the two test wavefronts along the first and second optical paths;

a first of said zones having a diffracting pattern for relatively diffracting the first test wavefront with respect to the reference wavefront;

a second of said zones having a different diffracting pattern for relatively diffracting the second test wavefront with respect to the reference wavefront; and said optical system conveying the first and second test wavefronts along said first and second optical paths at different grazing angles to the same substantial area of the test piece.

7. The interferometer of claim 6 in which said optical system also includes a second compound optic having a first zone with a diffracting pattern for further relatively diffracting the first test wavefront into alignment with the reference wavefront along the third optical path and a second zone with a different diffracting pattern for further relatively diffracting the second test wavefront into alignment with the reference wavefront along the third optical path.

8. The interferometer of claim 7 in which said first and second zones of the first compound optic relatively reshape the first and second test wavefronts from a common shape into different shapes and said first and second zones of the second compound optic further relatively reshape the test wavefronts from the different shapes into a shape in common with the same reference wavefront.

9. The interferometer of claim 8 in which said first and second zones of the second compound optic combine the two test wavefronts with the same reference wavefront.

10. The interferometer of claim 9 in which the first and second zones of the first compound optic combine the respective test wavefronts with the reference wavefront by diffracting the test and reference wavefronts through different diffraction orders.

11. An interferometer for measuring a test surface comprising:

a light source that produces a primary wavefront which is divided into a test wavefront and a reference wavefront;

an optical system including a first optical path along which the test wavefront is reflected from the test surface and a second optical path along which the reference wavefront is conveyed independently of the test surface into alignment with the test wavefront;

a compound optic having different zones for conveying the test wavefront to and from the test surface;

a first of said zones having a first optical characteristic affecting the conveyance to the test wavefront to the test surface;

a second of said zones having a second optical characteristic affecting the conveyance of the test wavefront from the test surface;

at least one of said first and second zones having a diffracting pattern for relatively diffracting the test wavefront with respect to the reference wavefront; and one of said first and second zones being at least partially reflective.

12. The interferometer of claim 11 in which said compound optic also divides the primary wavefront into the test and reference wavefronts.

13. The interferometer of claim 12 in which said second zone combines the test and reference wavefronts.

14. The interferometer of claim 13 in which said second zone is at least partially reflective.

15. The interferometer of claim 14 in which said second zone has a diffracting pattern that relatively diffracts the test wavefront into alignment with the reference wavefront.

16. The interferometer of claim 12 in which said first zone has a diffracting pattern that relatively reshapes the test wavefront with respect to the reference wavefront for reflecting from the test surface at a grazing angle.

17. The interferometer of claim 16 in which said compound optic has a third zone that conveys the reference wavefront independently of the test wavefront.

18. The interferometer of claim 16 further comprising a diffractive optic for combining the test and reference wavefronts.

19. The interferometer of claim 11 in which said optical characteristic of the first zone includes diffraction.

20. The interferometer of claim 19 in which said optical characteristic of the second zone includes at least partial reflection.

21. The interferometer of claim 20 in which said optical characteristic of the first zone also includes transmission.

22. The interferometer of claim 20 in which said optical characteristic of the second zone also includes diffraction.

23. The interferometer of claim 22, in which said first and second zones include diffracting patterns that differ in pitch.

24. An interferometer for measuring a test surface comprising:

a light source that produces a primary wavefront which is divided into a test wavefront and a reference wavefront;

an optical system including a first optical path along which the test wavefront is reflected from the test surface and a second optical path along which the reference wavefront is conveyed independently of the test surface into alignment with the test wavefront;

a compound optic having first and second zones for conveying the test wavefront to and from the test surface;

said first zone being transmissive for conveying the test wavefront to the test surface;

said second zone being reflective for conveying the test wavefront from the test surface; and a diffractive optic having a diffracting pattern for combining the reflected test wavefront with the reference wavefront for producing an interference pattern indicative of variations in the test surface.

25. The interferometer of claim 24 in which said compound optic includes a third zone which is transmissive for conveying the reference wavefront.

26. The interferometer of claim 25 in which said second zone separates said first and third zones.

27. The interferometer of claim 26 in which said first zone also has a diffracting pattern for diffracting the test wavefront.

28. The interferometer of claim 27 in which said first zone reshapes the test wavefront for reflecting from the test surface at a grazing angle.

29. An interferometer incorporating apparatus for aligning optical components used to measure a test surface comprising:

a source of light producing a primary wavefront that is divided into test and reference wavefronts;

first and second diffractive optics having a common reference axis;

said first diffractive optic having a measurement zone that relatively reshapes the test wavefront with respect to the reference wavefront for reflecting the test wavefront from the test surface at a grazing angle;

said second diffractive optic having a measurement zone that further relatively reshapes the test wavefront with respect to the reference wavefront for producing an optical interference pattern between the test and reference wavefronts indicative of variations in the test surface; and at least one of said diffractive optics having an alignment zone that differs from said measurement zone of the same diffractive optic for aligning said first and second diffractive optics with the common reference axis.

30. The interferometer of claim 29 in which said measurement zones of said first and second diffractive optics have diffracting patterns that differ in pitch.

31. The interferometer of claim 30 in which said alignment zone is a diffraction zone having a diffracting pattern that differs in pitch from said measurement zone of the same diffractive optic.

32. The interferometer of claim 31 in which said alignment zone of one of the diffractive optics has the same pitch as said measurement zone of the other diffractive optic.

33. The interferometer of claim 32 in which said alignment zone enables said first and second diffractive optics to be aligned in a substantially null condition.

34. The interferometer of claim 29 in which both of said diffractive optics have alignment zones for aligning said first and second diffractive optics with the common reference axis.

35. The interferometer of claim 34 in which said alignment zones of the first and second diffractive optics have diffracting patterns that match in pitch.

36. The interferometer of claim 35 in which said measurement zones of the first and second diffractive optics have diffracting patterns that differ in pitch with respect to each other and with respect to said diffracting patterns of the alignment zones.

37. The interferometer of claim 29 in which said alignment zone also includes focusing qualities for spacing said first and second diffractive optics at a predetermined distance along the common reference axis.

38. The interferometer of claim 37 in which said alignment zone is a diffraction zone having a diffracting pattern with a varying pitch.

39. The interferometer of claim 37 in which both of said diffractive optics have alignment zones with focusing qualities for spacing said diffractive optics in a substantially null condition.

40. The interferometer of claim 29 in which first diffractive optic also divides the primary wavefront into the test and reference wavefronts as well as an alignment wavefront and said second diffractive optic also combines both the test and alignment wavefronts with the reference wavefront.

41. The interferometer of claim 40, in which said alignment zone of the first diffractive optic relatively reshapes the alignment wavefront with respect to the reference wavefront into a different form than the test wavefront incident to the test surface.

42. The interferometer of claim 41 in which the alignment wavefront is shaped similar to the test wavefront incident to said second diffractive optic.

43. The interferometer of claim 40 in which said alignment zone of the second diffractive optic relatively reshapes the alignment wavefront with respect to the reference wavefront from a form different than the reflected test wavefront into a form in common with the reference wavefront.

44. The interferometer of claim 29 further comprising a spatial filter for blocking light transmitted by said alignment zone during measurement of the test surface.

45. The interferometer of claim 44 in which said spatial filter adjusts aperture size for blocking a portion of at least one of the test and reference wavefronts.

46. A method of making multiple measurements of a test piece with an interferometer at grazing incidence comprising the steps of:

产producing two test wavefronts and at least one reference wavefront;

conveying a first of the test wavefronts along a first path that reflects from a substantial area of the test piece;

conveying a second of the test wavefronts along a second path that reflects from the same substantial area of the test piece;

conveying the reference wavefront along a third path independently of the test piece into alignment with the two test wavefronts;

relating the two test wavefronts to each other with a first compound optic having distinct zones for conveying the first and second wavefronts along the first and second paths;

relatively diffracting the first test wavefront with respect to the reference wavefront using a first of the distinct zones; and relatively diffracting the second test wavefront with respect to the reference wavefront using a second of the distinct zones.

wherein said steps of conveying the first and second test wavefronts include conveying the first and second test wavefronts at different grazing angles to the same substantial area of the test piece.

47. The method of claim 46 including the further steps of further relating the two test wavefronts with each other with a second compound optic having distinct zones for conveying the first and second wavefronts along the first and second paths, and further relatively diffracting the first and second test wavefronts using the distinct zones of the second compound optic.

48. The method of claim 47 in which said steps of further relatively diffracting the first and second test wavefronts include relatively reshaping the reflected test wavefronts from different shapes into a shape in common with the same reference wavefront.

49. The method of claim 48 in which said steps of further relatively diffracting the first and second test wavefronts include using different diffraction orders to combine the two test wavefronts with the same reference wavefront.

50. A method of measuring a test surface using a compound optic in an interferometer comprising the steps of:

dividing a primary wavefront into a test wavefront and a reference wavefront;

conveying the test wavefront along a first path that reflects from the test surface;

conveying the reference wavefront along a second path independently of the test surface into alignment with the test wavefront;

positioning a compound optic along the first path having different zones for conveying the test wavefront to and from the test surface;

arranging first and second zones of the compound optic to exhibit different optical characteristics; and relatively diffracting the test wavefront with respect to the reference wavefront, wherein said step of arranging the first and second zones includes arranging one of the first and second zones to exhibit at least partial reflectivity.

51. The method of claim 50 including the further step of also positioning the compound optic along the second path for dividing the primary wavefront into the test and reference wavefronts.

52. The method of claim 51 in which the further step of positioning the compound optic along the second path provides for combining the test and reference wavefronts.

53. The method of claim 50 in which said step of conveying the test wavefront includes using the first zone of the compound optic to convey the test wavefront to the test piece.

54. The method of claim 53 in which said first zone relatively reshapes the test wavefront with respect to the reference wavefront into a shape different than the reference wavefront for reflecting from the test surface at a grazing angle.

55. The method of claim 53 in which said step of conveying the test wavefront includes using the second zone of the compound optic to convey the test wavefront from the test piece.

56. The method of claim 55 in which said second zone relatively reshapes the test wavefront with respect to the reference wavefront into a shape in common with the reference wavefront.

57. The method of claim 55 including the further step of arranging the compound optic with a third zone that conveys the reference wavefront independently of the test wavefront.

58. A method of measuring a test surface using a compound optic in an interferometer comprising the steps of:

dividing a primary wavefront into a test wavefront and a reference wavefront;

conveying the test wavefront along a first path that reflects from the test surface;

conveying the reference wavefront along a second path independently of the test surface into alignment with the test wavefront;

positioning a compound optic along the first path having different zones for conveying the test wavefront to and from the test surface; arranging first and second zones of the compound optic to exhibit different optical characteristics; and relatively diffracting the test wavefront with respect to the reference wavefront, wherein said step of arranging the first and second zones includes arranging one of the zones for transmitting the test wavefront and another of the zones for reflecting the test wavefront.

59. The method of claim 58 in which both of said zones also diffract the test wavefront.

60. A method of aligning first and second diffractive optics in an interferometer for measuring a test surface:

producing a primary wavefront that is divided into test and reference wavefronts;

arranging the first diffractive optic with a measurement zone that relatively reshapes the test wavefront with respect to the reference wavefront for reflecting the test wavefront from the test surfaces at a grazing angle;

arranging the second diffractive optic with a measurement zone that further relatively reshapes the test wavefront with respect to the reference wavefront for producing an optical interference pattern between the test and reference wavefronts indicative of variations in the test surface; and arranging at least one of the first and second diffractive optics to include an alignment zone that differs from the measurement zone of the same diffractive optic for aligning the first and second diffractive optics with a common reference axis.

61. The method of claim 60 in which said steps of arranging the first and second diffractive optics include arranging the respective measurement zones of the first and second diffractive optics to exhibit different diffracting patterns.

62. The method of claim 61 in which said step of arranging at least one of the first and second diffractive optics to include an alignment zone includes arranging the alignment zone as a diffraction zone having a diffracting pattern that differs from the measurement zone of the same diffractive optic.

63. The method of claim 62 in which the diffracting pattern of the alignment zone of one of the diffractive optics is arranged to match the diffracting pattern of the measurement zone of the other of the diffractive optics for aligning the two diffractive optics in a substantially null condition.

64. The method of claim 61 in which said step of arranging at least one of the first and second diffractive optics to include an alignment zone includes arranging both of the first and second optics to include respective alignment zones.

65. The method of claim 64 in which the respective alignment zones are arranged with diffracting patterns for aligning the two diffractive optics in a substantially null condition.

66. The method of claim 64 in which said respective alignment zones are arranged with focusing qualities for spacing the two diffractive optics in a substantially null condition.

* * * * *